(12) United States Patent
Dickelman

(10) Patent No.: US 10,733,643 B2
(45) Date of Patent: Aug. 4, 2020

(54) SYSTEMS, DEVICES AND METHODS FOR COMPUTER AUTOMATED ASSISTANCE FOR DISPARATE NETWORKS AND INTERNET INTERFACES

(71) Applicant: U.S. Bank National Association, Cincinnati, OH (US)

(72) Inventor: Mark Dickelman, Inverness, IL (US)

(73) Assignee: U.S. Bank National Association, Cincinnati, OH (US)

( * ) Notice: Subject to any disclaimer, the term of this patent is extended or adjusted under 35 U.S.C. 154(b) by 549 days.

(21) Appl. No.: 15/298,027

(22) Filed: Oct. 19, 2016

(65) Prior Publication Data

US 2017/0039609 A1  Feb. 9, 2017

Related U.S. Application Data

(63) Continuation of application No. 12/323,175, filed on Nov. 25, 2008, now abandoned.
(Continued)

(51) Int. Cl.
*G06Q 40/00* (2012.01)
*G06Q 30/06* (2012.01)
(Continued)

(52) U.S. Cl.
CPC ......... *G06Q 30/0601* (2013.01); *G06Q 20/10* (2013.01); *G06Q 20/12* (2013.01);
(Continued)

(58) Field of Classification Search
CPC .... G06Q 30/0601; G06Q 20/10; G06Q 20/12; G06Q 20/40; G06Q 30/0277; G06Q 30/06; G06Q 50/01
(Continued)

(56) References Cited

U.S. PATENT DOCUMENTS

| | | | | |
|---|---|---|---|---|
| 5,424,938 A | * | 6/1995 | Wagner | G06F 9/466 |
| | | | | 705/42 |
| 5,453,601 A | * | 9/1995 | Rosen | G06Q 20/3676 |
| | | | | 705/65 |

(Continued)

OTHER PUBLICATIONS

Mann, R. J. (2004). Regulating internet payment intermediaries. Texas Law Review, 82(3), 681-716. Retrieved from http://dialog.proquest.com/professional/docview/203716652?accountid=131444 on Mar. 12, 2020 (Year: 2004).*

(Continued)

*Primary Examiner* — Kito R Robinson
(74) *Attorney, Agent, or Firm* — Crawford Maunu PLLC

(57) ABSTRACT

A variety of systems, methods and arrangements are implemented in connection with a processor-controlled routing arrangement. According to one such implementation, a computer-implemented method facilitates payment provided between disparate payment networks of buyers and sellers. The method uses a computer-arrangement to interface with a social website that has user profiles, each user profile corresponding to a user identifier, and for use with a seller website that offers products or services for purchase by users and that generates transaction data for a current user accessing the website. A current user identifier corresponding to a current user profile and the transaction data is communicates to the computer-arrangement. A buyer payment network is selected from a plurality of disparate buyer payment networks that are each associated with the current user identifier. Based upon the selection, the transaction data is formatted to facilitate payment against the selected buyer payment network.

11 Claims, 4 Drawing Sheets

Related U.S. Application Data

(60) Provisional application No. 61/092,248, filed on Aug. 27, 2008, provisional application No. 60/991,379, filed on Nov. 30, 2007.

(51) Int. Cl.
  *G06Q 20/12* (2012.01)
  *G06Q 20/40* (2012.01)
  *G06Q 20/10* (2012.01)
  *G06Q 30/02* (2012.01)
  *G06Q 50/00* (2012.01)

(52) U.S. Cl.
  CPC ............ *G06Q 20/40* (2013.01); *G06Q 20/401* (2013.01); *G06Q 30/0277* (2013.01); *G06Q 30/06* (2013.01); *G06Q 50/01* (2013.01)

(58) Field of Classification Search
  USPC ........................................ 705/26, 35, 39, 44
  See application file for complete search history.

(56) References Cited

U.S. PATENT DOCUMENTS

| | | | |
|---|---|---|---|
| 5,465,206 A | 11/1995 | Hilt et al. | |
| 5,596,642 A | 1/1997 | Davis et al. | |
| 5,596,643 A | 1/1997 | Davis et al. | |
| 5,638,445 A | 6/1997 | Spelman et al. | |
| 5,649,117 A | 7/1997 | Landry | |
| 5,649,118 A | 7/1997 | Carlisle et al. | |
| 5,650,604 A | 7/1997 | Marcous et al. | |
| 5,717,989 A | 2/1998 | Tozzoli et al. | |
| 6,058,381 A | 5/2000 | Nelson | |
| 6,070,150 A | 5/2000 | Remington et al. | |
| 6,072,870 A | 6/2000 | Nguyen et al. | |
| 6,292,789 B1 | 9/2001 | Schutzer | |
| 6,298,335 B1 | 10/2001 | Bernstein | |
| 6,529,187 B1 | 3/2003 | Dickelman | |
| 7,092,913 B2 | 8/2006 | Cannon, Jr. | |
| 7,174,302 B2 | 2/2007 | Patricelli et al. | |
| 7,280,981 B2 | 10/2007 | Huang et al. | |
| 7,346,577 B1 * | 3/2008 | Williams | G06Q 20/02 705/34 |
| 7,464,859 B1 | 12/2008 | Hawkins | |
| 7,584,151 B2 * | 9/2009 | Wells | G06Q 20/04 705/64 |
| 7,590,557 B2 | 9/2009 | Harrison et al. | |
| 7,610,040 B2 * | 10/2009 | Cantini | G06Q 20/04 340/5.9 |
| 7,620,636 B2 | 11/2009 | Fasciano | |
| 7,627,523 B1 | 12/2009 | Symonds et al. | |
| 7,661,586 B2 | 2/2010 | Robbins, Jr. et al. | |
| 7,664,690 B2 | 2/2010 | Dirnberger et al. | |
| 7,680,679 B1 | 3/2010 | Patricelli et al. | |
| 7,702,530 B2 | 4/2010 | Pearson | |
| 7,702,553 B1 | 4/2010 | Dickelman | |
| 7,702,577 B1 | 4/2010 | Dickelman | |
| 7,711,621 B2 | 5/2010 | Huang et al. | |
| 7,765,257 B2 | 7/2010 | Chen et al. | |
| 8,082,211 B2 | 12/2011 | Hoffman et al. | |
| 8,224,755 B2 | 7/2012 | Goodman et al. | |
| 8,694,577 B2 * | 4/2014 | D'Angelo | G06Q 10/10 709/203 |
| 2001/0014878 A1 | 8/2001 | Mitra et al. | |
| 2001/0027439 A1 * | 10/2001 | Holtzman | G01R 33/50 705/39 |
| 2002/0002495 A1 | 1/2002 | Ullman | |
| 2002/0026425 A1 * | 2/2002 | Fahraeus | G06F 3/03545 705/64 |
| 2002/0046189 A1 * | 4/2002 | Morita | G06Q 20/04 705/67 |
| 2002/0052782 A1 | 5/2002 | Landesmann | |
| 2002/0059114 A1 * | 5/2002 | Cockrill | G06Q 20/04 705/26.81 |
| 2002/0111886 A1 | 8/2002 | Chenevich et al. | |
| 2002/0111915 A1 | 8/2002 | Clemens et al. | |
| 2002/0111916 A1 * | 8/2002 | Coronna | G06Q 20/00 705/64 |
| 2002/0120537 A1 * | 8/2002 | Morea | G06Q 30/02 705/35 |
| 2002/0123972 A1 * | 9/2002 | Hodgson | G06Q 20/04 705/72 |
| 2002/0145051 A1 | 10/2002 | Charrin | |
| 2002/0184147 A1 | 12/2002 | Boulger | |
| 2003/0061147 A1 | 3/2003 | Fluhr et al. | |
| 2003/0061157 A1 | 3/2003 | Hirka et al. | |
| 2004/0024703 A1 | 2/2004 | Roskind | |
| 2004/0030657 A1 | 2/2004 | Holm-Blagg et al. | |
| 2004/0044621 A1 * | 3/2004 | Huang | G06Q 20/02 705/40 |
| 2004/0064375 A1 * | 4/2004 | Randell | G06Q 30/04 705/30 |
| 2004/0080691 A1 | 4/2004 | Mi et al. | |
| 2004/0093302 A1 | 5/2004 | Baker et al. | |
| 2004/0172312 A1 * | 9/2004 | Selwanes | G06Q 20/341 705/4 |
| 2005/0060579 A1 | 3/2005 | Dickelman et al. | |
| 2005/0077350 A1 | 4/2005 | Courtion et al. | |
| 2005/0171955 A1 | 8/2005 | Hull et al. | |
| 2005/0209938 A1 * | 9/2005 | Czyzewski | G06Q 20/227 705/30 |
| 2005/0211765 A1 * | 9/2005 | Brown | G06Q 20/102 235/379 |
| 2005/0267840 A1 | 12/2005 | Holm-Blagg et al. | |
| 2006/0020542 A1 * | 1/2006 | Litle | G06Q 10/10 705/40 |
| 2006/0089906 A1 | 4/2006 | Rowley | |
| 2006/0116957 A1 | 6/2006 | May et al. | |
| 2006/0277148 A1 * | 12/2006 | Thackston | G06Q 20/02 705/41 |
| 2007/0038577 A1 | 2/2007 | Werner et al. | |
| 2007/0038853 A1 * | 2/2007 | Day | H04L 63/0281 713/153 |
| 2007/0112762 A1 * | 5/2007 | Brubaker | G06Q 30/02 |
| 2007/0133768 A1 * | 6/2007 | Singh | H04M 15/00 379/114.14 |
| 2007/0175992 A1 * | 8/2007 | Brown | G06Q 10/087 235/385 |
| 2007/0233615 A1 * | 10/2007 | Tumminaro | G06Q 20/12 705/75 |
| 2007/0260520 A1 * | 11/2007 | Jha | G06O 30/02 705/14.44 |
| 2007/0282743 A1 | 12/2007 | Lovelett et al. | |
| 2008/0046358 A1 | 2/2008 | Holm-Blagg et al. | |
| 2008/0103985 A1 | 5/2008 | Huang et al. | |
| 2008/0104495 A1 | 5/2008 | Craig | |
| 2008/0140502 A1 * | 6/2008 | Birnholz | G06Q 30/02 705/14.72 |
| 2008/0162259 A1 * | 7/2008 | Patil | G06Q 30/02 705/7.29 |
| 2008/0172344 A1 * | 7/2008 | Eager | G06Q 30/02 705/80 |
| 2008/0182563 A1 * | 7/2008 | Wugofski | G06Q 10/10 455/414.2 |
| 2008/0183593 A1 * | 7/2008 | Dierks | G06Q 20/102 705/26.35 |
| 2008/0228595 A1 | 9/2008 | Hill et al. | |
| 2008/0228598 A1 | 9/2008 | Leff et al. | |
| 2008/0275748 A1 * | 11/2008 | John | G06Q 20/40 705/35 |
| 2008/0288405 A1 | 11/2008 | John | |
| 2008/0306838 A1 * | 12/2008 | Fleet | G06Q 30/0603 705/26.81 |
| 2008/0307034 A1 | 12/2008 | Fleet et al. | |
| 2009/0006206 A1 * | 1/2009 | Groe | G06Q 30/02 705/14.44 |
| 2009/0030848 A1 | 1/2009 | Wendel | |
| 2009/0055263 A1 * | 2/2009 | Okubo | G06Q 30/02 705/14.69 |
| 2009/0070219 A1 * | 3/2009 | D'Angelo | G06Q 10/10 705/14.56 |

(56) References Cited

U.S. PATENT DOCUMENTS

| | | |
|---|---|---|
| 2009/0070412 A1* | 3/2009 | D'Angelo .............. G06Q 10/10 709/203 |
| 2009/0070435 A1 | 3/2009 | Abhyanker |
| 2009/0094134 A1* | 4/2009 | Toomer ................... H04W 4/21 705/26.1 |
| 2009/0132395 A1* | 5/2009 | Lam ....................... G06Q 30/02 705/30 |
| 2009/0183008 A1 | 7/2009 | Jobmann |
| 2010/0030578 A1 | 2/2010 | Siddique et al. |
| 2010/0131366 A1* | 5/2010 | Gibson .................. G06Q 30/02 705/14.58 |
| 2010/0145856 A1* | 6/2010 | Kardokas .............. G06Q 20/40 705/44 |
| 2010/0312572 A1 | 12/2010 | Ramer et al. |
| 2011/0040586 A1* | 2/2011 | Murray .................. G06Q 30/02 705/14.49 |
| 2011/0047070 A1* | 2/2011 | Farias .................. G06Q 20/102 705/38 |

OTHER PUBLICATIONS

Metromojo.com uses ClickandBuy for U.S. and european local social networks. (Jun. 4, 2007). Business Wire Retrieved from http://dialog.proquest.com/professional/docview/445030082?accountid=131444 on Mar. 12, 2020 (Year: 2007).*

* cited by examiner

SYSTEMS, DEVICES AND METHODS FOR COMPUTER AUTOMATED ASSISTANCE FOR DISPARATE NETWORKS AND INTERNET INTERFACES

RELATED PATENT DOCUMENTS

This patent document is a continuation under 35 U.S.C. § 120 of U.S. patent application Ser. No. 12/323,175 filed on Nov. 25, 2008, which claims the benefit, under 35 U.S.C. § 119(e), of U.S. Provisional Patent Application Ser. No. 61/092,248, entitled "Systems, Devices And Methods For Computer Automated Assistance For Transactions Involving Websites" to Dickelman, Mark and filed on Aug. 27, 2008 and of U.S. Provisional Patent Application Ser. No. 60/991,379, entitled "Control System Arrangements and Methods for Disparate Network Systems" to Dickelman, Mark and filed on Nov. 30, 2007, which are each fully incorporated herein by reference as describing and illustrating subject matter (in part(s) or in its entirety) that can be practiced with the subject matter disclosed herein.

FIELD OF INVENTION

This invention relates generally to computer-automated functions to facilitate processing of accounting data ensuing from purchases involving use of the Internet and disparate buyer/seller networks. A specific example involves processing data to generate an output that is useful when a user of a first website desires to purchase merchant offerings from a second website.

BACKGROUND

The enormous growth and success of the Internet has resulted in many new and emerging markets. Lagging behind the growth of Internet-based applications are processing systems that generate data that can be used in connection with providing desirable functionality, such as security and ease of use. One expanding market involves social network services (e.g., Bebo, Facebook, Flickr, Kodak Gallery, or Myspace) and other services that provide a customizable experience for each user. Social network services often take the form of websites. Social network services offer social interactions between users of the website. For example, many social websites allow a user to customize how their interface looks for themselves and others who view the websites. The social network services can link different user-controlled webpages/data according to information submitted by the users. For example, the customizations can include links between other friends on the websites, personal information, pictures or music selections. The recent increase in popularity of social websites has led to their use in a commercial context.

SUMMARY

Consistent with certain specific example implementations of the invention, aspects are summarized as follows.

According to one embodiment of the present invention, an interface is provided between a potential buyer and a disparate payment network system. The interface facilitates the use of the disparate payment network system using buyer-profile data associated with a social website. A computer arrangement receives buyer-profile data and selects one or both of a buyer payment network and a seller payment network. In a particular implementation, a selected buyer payment network can be used to process the transaction without providing buyer account information to the seller.

According to one specific example implementation which is useful with a social website that implements user profiles, each user profile has a user identifier, and a seller website offers products or services for purchase by users. In this environment, the present invention is directed to methods and systems involving receiving, from the social website, a current user identifier corresponding to a current user profile; receiving transaction data for a purchase transaction to be made by a current user associated with the current user identifier, the current user using the seller website to generate the transaction data; associating the current user identifier with a buyer account; verifying the purchase transaction; and authorizing the purchase transaction.

According to another example implementation for use in a related environment, the present invention is directed to methods and systems involving receiving, from the website, a current user identifier corresponding to a current user profile; receiving, from the website, transaction data for a purchase transaction to be made by a current user associated with the current user identifier; associating the current user identifier with a disparate network identifier; verifying the identity of the current user; selecting a payment network to debit the purchase amount; and authorizing the purchase transaction.

According to yet another example implementation, the present invention is directed to methods and systems involving associating a current user with a current user profile; verifying the identity of the current user; providing a current user identifier from the current user profile to a disparate network system; providing transaction data to the disparate network system for a purchase transaction to be made by the current user; and completing the purchase transaction in response to an authorization received from the disparate network system.

The above summary is not intended to describe each illustrated embodiment or every implementation of the present invention.

BRIEF DESCRIPTION OF THE DRAWINGS

The invention may be more completely understood in consideration of the detailed description of various embodiments of the invention that follows in connection with the accompanying drawings, in which.

Figure 1:
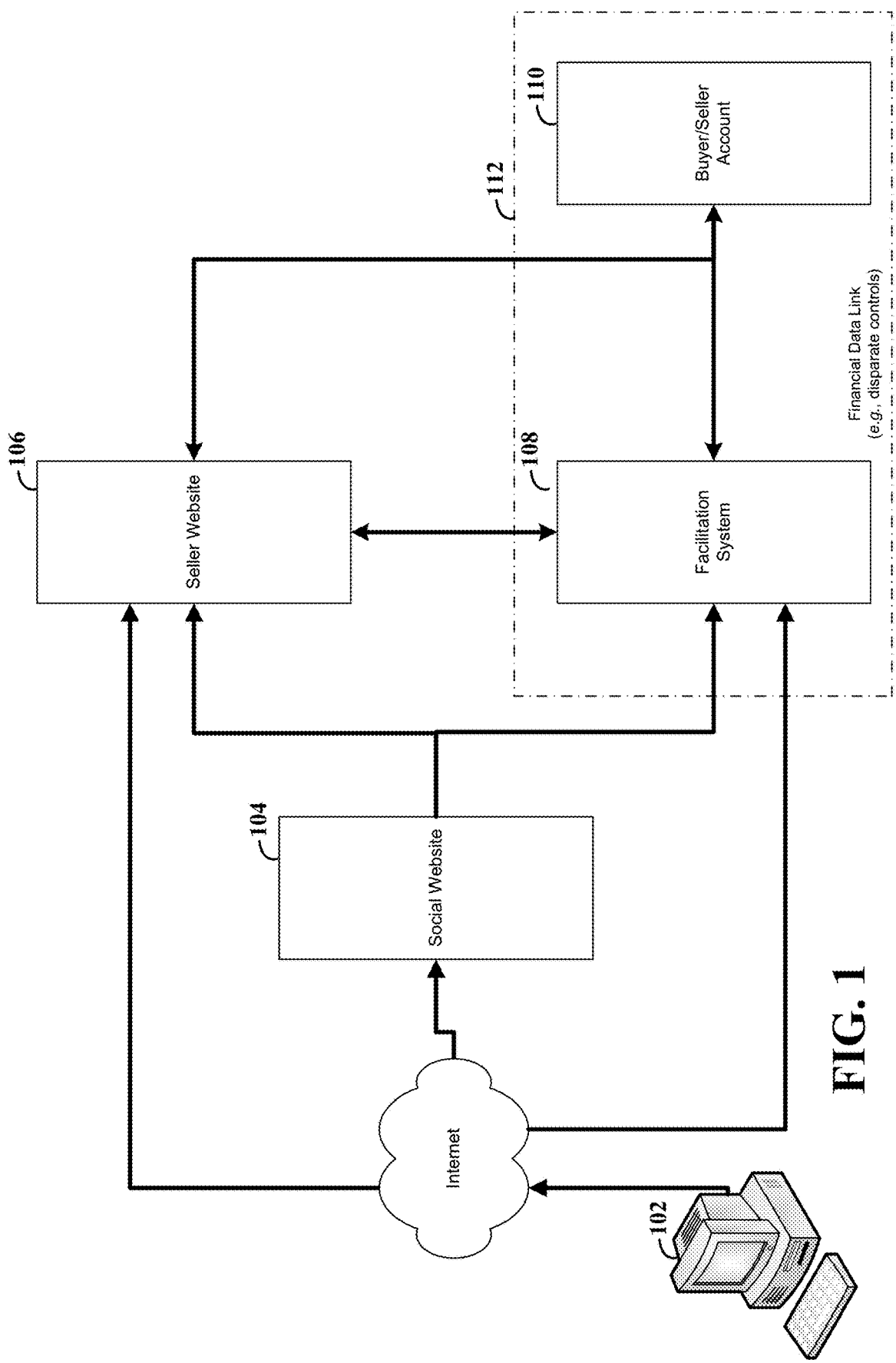
FIG. 1 shows a diagram of a data processing system for processing Internet-based data, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DISCUSSION

Consistent with an embodiment of the present invention, a data-processing based system processes data related to a first website and a second, seller website. In a particular instance, a first website provides a service, such as user-customizable interfaces or social network functions. Each user provides the first website with some sort of identification (e.g., username and password). The first website provides a customized interface for viewing and other uses. The first website also provides the users with options to purchase goods or services from sellers that have other websites. Users making purchases at the seller websites are facilitated by various systems, methods and arrangements. In a specific instance, a transaction is facilitated by generating data used in connection with automated functions that lessen the burden on the buyer. These automated functions can include implementation of a routing matrix allowing use of a variety of disparate and autonomous payment networks. While the present invention is not necessarily limited to such applications, various aspects of the invention may be appreciated through a discussion of various examples using this context.

Consistent with a specific embodiment of the present invention, a third party data processing system facilitates a transaction between a seller and a buyer over the Internet after receiving user-related data from a social website. The third party system matches the user-related data with an associated buyer account and facilitates the transaction by, for example, initiating payment from the buyer account to a seller account.

Consistent with another embodiment of the present invention, a third party facilitates a transaction between a seller and a buyer by verifying the authenticity of the transaction after receiving verification data from the buyer, the seller, a social network service/website or combinations thereof.

Consistent with an embodiment of the present invention, a third party facilitates a transaction between a seller and a buyer by verifying the identity and/or intentions of the buyer and thereafter enabling the purchase to be processed.

Consistent with a specific embodiment of the present invention, the seller need not have direct knowledge of the buyer's selected network(s). In certain instances, the buyer and seller do not have existing agreements with the selected network of the other party and the selected networks also do not have agreements between themselves.

According to an example embodiment of the present invention, a system is implemented for processing buyer-seller transactions using disparate, autonomous seller and buyer networks and accounts held therein. The system captures buyer and seller transaction data associated with the sale and purchase of goods or services. In one embodiment of the invention, the system selects a buyer network from a plurality of possible networks. The system routes a portion of the buyer-seller transaction data to the selected buyer network. In a particular instance, the buyer network is a network for which the seller does not have an existing relationship.

In another embodiment of the invention, the system selects a seller network from a plurality of possible networks. The system routes a portion of the buyer-seller transaction data to the selected seller network. In a particular instance, the seller network is a network for which the buyer does not have an existing relationship or vice versa.

Consistent with one embodiment of the invention, the system selects both a seller network and a buyer network from a plurality of possible networks. The system routes a portion of the buyer-seller transaction data to the selected networks.

Another embodiment of the invention includes the identification of potential accounts in the seller access network on an account-by-account (e.g., Payment Card Account) basis. In certain instances, the identified accounts include accounts for which bilateral agreements do not exist with the payment network associated with the buyer identification of selected payment network. For example, the buyer identification could be associated with use of a buyer-owned credit card, while the payment network could be a payment network that operates independently from the credit card payment network. Thus, the selected payment network need not have any knowledge of a buyer credit card account associated with the credit card used to validate the buyer identity.

Social websites sell advertisements on their pages. Often these advertisements allow a viewer to click on the advertisement and purchase goods or services from the advertisement's source. This can include an embedded hyper-link that takes the buyer to a site hosted by the seller of the advertisement's goods or services. Assuming the buyer wishes to make a purchase, payment arrangements are instituted as necessary.

One payment arrangement involves the buyer entering account information identifying an account from which the seller receives payment. The account information often takes the form of a credit or debit account number. It is at this point that a buyer may hesitate in making a purchase. For instance, the buyer may not trust a seller with their account information when not familiar with the seller. Additionally, the buyer may need to find the necessary account information before being able to enter the information. Each additional step that a buyer must undertake presents another opportunity for the buyer to decide against making a purchase.

As discussed above, seller and buyer transactions often involve the use of payment systems and associated networks. More and more transactions are accomplished without direct payment (e.g., cash) from the buyer to the merchant/seller. Generally, these associated networks involve two primary components. The first component is a seller access network (e.g., Nova®) that provides connection to the point-of-sale (POS) devices (either directly or via merchant internal networks) and identification of the type of payment account (e.g., Visa® or Voyager®). A second component includes payment processing networks that process payment instructions based agreements established by the participants. Generally, these payment processing networks are one of two different categories, proprietary networks (e.g., Voyager®) or association networks. Examples of association networks include the networks provided by VISA® and MASTERCARD® and/or the particular acquiring/issuing banks. For a particular transaction, the operator of the association network controls the flow of funds for the transaction. Often, this includes a fee that is passed on to the seller, such as a percentage of the transaction. The participating sellers have an agreement with the network (e.g., Visa® or MasterCard®), but do not have a transactional relationship between one another with respect to the association network transactions.

Such transactions are often implemented where the seller has an existing relationship with a bank. The seller sends the transaction information to this bank, sometimes referred to as the acquiring bank. The acquiring bank can forward the payment information to a bank that issued the card, sometimes referred to as the issuing bank. Often the payment processing networks assign interchange fees that are paid between the parties based on the type of transaction, authentication and location; these fees may be passed on to the seller.

An example of a proprietary network is a merchant-provided in-store credit or debit account. The seller, or a seller-contracted third party, handles the settlement, authorization and/or other functions associated with a transaction. In some instances, the seller can form bilateral agreements with other sellers to allow use of one network by multiple sellers or to coordinate use of multiple networks between multiple sellers. The sellers establish the bilateral agreements with one another to allow such functionality. For instance, two department stores may allow use of the same proprietary network card at either store or they may allow use of two different proprietary network cards (i.e., one from each store) at either store.

A few networks allow for a single (multi-purpose) card to provide access to more than one account. The card interfaces with a network that would otherwise support one or more of the accounts. The cardholder designates a desired account to use. The transaction is processed as if the card associated with the desired account had been used. Thus, the underlying transactional functions operate in much the same manner as if the original card had been used. The buyer still carries the multi-purpose card and can only use the multi-purpose card at locations that support that particular card.

Consistent with an example embodiment of the present invention, an approach to processing payment involves controlling interactions between disparate, autonomous payment processing networks to process different payment aspects for a common set of transaction data received for a particular transaction. For instance, when a merchant (i.e., seller) transmits point-of-sale purchase data including a transaction amount and buyer's account data (e.g., obtained from a credit-type or debit-type card or related account number associated therewith), an integrated processor receives the point-of-sale data and coordinates electronic funds transfers with two or more of the autonomous networks. In this context, a single card or account can be used as a manner in which to access a plurality of payment networks, and payment for a common transaction can be effected using disparate, autonomous networks that, absent the integrated processor, would not otherwise be capable of communicating with one another. In many aspects, such an approach involves interacting with payment networks configured and operated for operating independently, to respectively provide payment to a merchant and effect settlement from a buyer, with these functions now carried out via the integrated processor.

These payment processing approaches are amenable to use in processing payment using a multitude of different payment approaches and scenarios involving one or more accounts and participating networks for buyers, merchants or other transaction participants. For example, some embodiments are directed to providing payment from a buyer using a first payment processing network (e.g., a Elavon® and/or VISA® network as described above) to obtain account information for the buyer, and providing settlement to a merchant using a different account (and its related payment network) for the buyer. Other embodiments are directed to using different accounts and related payment networks for effecting payment and for providing settlement for the buyer. Other embodiments are directed to using different accounts and related payment networks for collecting an initial pre-payment (e.g., an immediate payment from a third party) for collecting subsequent payment from the buyer and, where appropriate, for providing settlement for the pre-payment. Still other embodiments are directed to providing payment from a buyer using an account for the buyer and its related payment processing network, and providing electronic funds from the payment to a merchant account that uses a different payment network. Other combinations of networks are also used in connection with various embodiments.

As should be appreciated, the central/integrated processor can thus coordinate interactions between a multitude of different accounts and different payment networks, and can do so using a single account for a particular transaction participant in order to access other accounts for the participant. For instance in transaction involving the sale of goods or services from a seller to a buyer, a payment network can be selected for the buyer that is disparate from the payment network used by seller by using a standardized card or a proprietary network, or other buyer identification sufficient upon which to authorize payment. This can be useful for allowing a buyer to use a standardized card and a seller having only access to (or preferring the use of) a proprietary network. Payment authorization may involve an audit, which may include comparing data from one or more of a buyer-based audit, seller-based audit or an audit based upon a third party operating the central/integrated processor. The results of the audit can be provided to the selected networks and used, for example as indication that the transaction can go forward (e.g., validation regarding the transaction amount and source).

Payment accounts and related networks are selected using one or more of a variety of approaches. In some embodiments, user profiles with any appropriate rules are stored and used to identify and select an available account for effecting payment for a transaction. These profiles (and rules) can be stored for buyers and, as appropriate, sellers. In some applications, an account and related payment network is selected automatically from profile data and related rules. In other instances, user input is obtained in order to select a payment account, to allow a buyer and/or seller to directly select and control the use of a particular payment account. In all of these instances, parties to a particular transaction need not have direct knowledge of account and related payment network for other parties to the transaction, and further do not need to participate in any agreement with a payment network used by another party. In addition, such approaches may be carried out using a processor (e.g., a computer) that uses profiles, rules and transaction information to selecting, routing and otherwise implementing associated accounts and related payment networks.

While not necessarily limited thereto, various embodiments are directed to the implementation of processor arrangements and systems, consistent with discussion herein, at financial institutions such as banking institutions that are well suited for making use of network and account access. For instance, banking institutions have many existing interfaces to payment networks, and many payment networks are linked to accounts held at a banking institution. The payment networks operate by transferring money to and from these accounts, thereby completing transactions. Other payment networks use local banking institutions as intermediaries to transfer funds. The use of a bank can be beneficial for a number of reasons including, but not limited to, secured transactions, federal insurance and relative stability; however, disparate payment networks do not have automated mechanisms to transfer funds therebetween.

Aspects of the present invention, when implemented by a banking institution, can provide automated access between such networks. In some instances, the transactions can be implemented with the transaction details being transparent to the payment networks and/or the individual participants. For example, an individual participant could identify a desired payment network to use without requiring that a front-end payment network (e.g., the payment network associated with the POS transaction) have a pre-existing bilateral agreement with a desired payment network. A specific example of such an instance involves a buyer's use of a credit card to implement a POS transaction. Consistent with one implementation of the present invention, credit card transaction data is received by a banking institution, which can use a payment routing network to select a payment network, other than a payment network associated with the credit card, to complete the transaction. Accordingly, the aspects of the present invention can be particularly useful for providing a centralized routing system that operates using existing autonomous and disparate payment networks. Moreover, these approaches may be carried out using an identification of a user, be that based upon a particular payment account (e.g., a credit card) or based upon another form of identification (e.g., a mobile phone account or a state-issued identification card (e.g., driver's license), where payment is carried out using a wholly different payment account. That is, once a buyer is identified into the system, using one or more of a multitude of identification approaches, payment accounts and networks can be selected and implemented independent from any manner in which that buyer is identified. Seller accounts and networks can be similarly selected.

Accordingly, transaction data can be received according to a number of formats. These formats can be consistent with existing transactional formats (e.g., a credit card transaction format or a debit card transaction format) or they can operate using non-traditional formats (e.g., proprietary formats or Internet-based transmission formats). The received data can then be processed by a computer arrangement to generate data that is formatted according to a selected payment network. Providing such functionality can be particularly useful for a variety of reasons. A seller may be more comfortable with, or only provide, certain payment options from a buyer. For instance, a seller may accept certain credit cards, but not accept other payment options (e.g., bank account transfers, stored value cards, financial-investment accounts or medical-based accounts). The buyer, however, may desire to use these accounts. In some cases, the buyer may be precluded for making the purchase. In other cases, the buyer may need to manually transfer funds between accounts. A similar situation can exist for a seller. Aspects of the present invention, however, are particularly useful for facilitating direct access to a desired payment network by buyer or seller. This access can be implemented for a variety of disparate and autonomous payment networks including payment networks of a buyer, a seller, the POS purchase and/or combinations thereof.

Embodiments of the present invention allow a user of a social networking service and a seller of a service to use their desired payment networks, which might be disparate networks, to complete a transaction. In some embodiments, the seller and buyer need not support (or even be aware of) the network used by the other and the networks need not have established bilateral agreements.

FIG. 1 shows a system diagram for facilitating payment between users of a first website wishing to buy from a seller hosting a different website, according to an example embodiment of the present invention. A potential buyer 102 accesses the social website 104 through a network, such as the Internet. The operator of social website 104 need not directly provide goods or services for sale to the buyer. Alternatively, operator of social website 104 could provide some goods or services for sale but does not directly provide the goods or services that the buyer desires to purchase via the seller website 106.

Social website 104 provides an option for buyer 102 to view and/or purchase goods from seller website 106. This can include, for example, seller advertisements and links to the seller website 106. In order to facilitate a purchase by buyer 102 for these goods or services provided via seller website 106, a financial data link 112 operates to facilitate access to buyer and/or seller account 110. In a particular implementation, financial data link 112 can operate using disparate payment networks for the buyer and/or seller accounts as discussed in more detail in connection with FIG. 4. Facilitation system 108 is able to provide one or more transaction-related functions, such as disparate network access, security, account identification and auditing.

In one embodiment, system 108 facilitates access to buyer account 110 in response to a seller-initiated transfer request. This can be useful in completing a transaction between buyer 102 and the seller. Data from the social website is used by system 108, for example, to identify buyer 102 and/or buyer account 110.

In one embodiment of the present invention, social website 104 receives identification information about buyer 102. For example, buyer 102 may enter a username and a password. Social website 104 may then provide the user with personalized features. When buyer 102 indicates interest in a good or service offered by the seller (e.g., by clicking on an advertisement), the identification of buyer 102 can be used to facilitate any purchase made thereafter.

In one embodiment of the present invention, a buyer identifier is sent to system 108. Using the identifier, system 108 determines one or more potential buyer accounts. If buyer 102 wishes to purchase goods or services from the seller, the identified buyer account(s) can be used for the transaction.

In certain instances system 108 can request confirmation information from buyer 102. For example, the buyer can be asked to enter a user name and password, a pin number or other security information. To provide additional security to buyer 102, the system could be linked to a trusted financial institution, such as a bank. Thus, when buyer 102 is prompted for additional security information, the request is seen as originating from the trusted financial institution. The system can also offer buyer 102 with the choice to select between the identified buyer accounts or to select an additional as yet unidentified account (e.g., by entering appropriate account information).

In one embodiment, system 108 can prioritize the buyer accounts according to a set of business rules. For example, the system may select the buyer account that provides the buyer with the best incentives (e.g., cash back or rewards programs). The buyer can be notified of such incentives when presented with the account selection options. The buyer can also be presented with an option to join various services/programs offered by system 108 and/or buyer account 110, thereby facilitating population of the services/programs.

In one implementation a buyer/seller profile can include data that is used to access the various disparate payment networks. This can include information including, but not limited to, account numbers, access codes or verification data. This information and the transaction data can then be formatted according to the selected payment network(s).

In one embodiment of the present invention, system 108 sends buyer account data to the seller to facilitate payment from buyer 102. The seller can use the account data to contact the holder of buyer account 110 and perform settlement therewith. As a non-limiting example, buyer account 110 can be a credit card account. System 108 can send the credit card account information to buyer 102 and buyer 102 can contact the appropriate credit card network directly. This information can be sent, for example, by preloading a website page with the appropriate information. This can then be displayed for the buyer. In certain implementations, this data can be sent to the buyer and not the seller, thereby reducing the exposure of the buyer account by not directly providing buyer information to the seller. Instead, the seller receives confirmation of the transaction from the computer arrangement (e.g., implemented at a bank). This dissociation between the buyer payment network and the data provided to the seller can be useful for instances where buyer wishes to purchase from a seller for which the buyer is not familiar. Regardless of whether the seller is legitimate, at the very least, the buyer account information for the particular payment network is not exposed to a potentially fraudulent seller. Other possible advantages relate to reduced number of people and transmission points of the buyer account information.

The transactional information can be further subject to fraud monitoring and/or can use additional authentication/verification measures. These measures can include, for example, contacting the buyer/seller using an alternative communication mechanism. In one implementation, the fraudulent monitoring is buttressed by having access to multiple buyer/seller payment networks. Thus, aspects of the present invention can be useful for affording both the buyer and seller with additional security measures.

In another embodiment of the present invention, the seller sends the transaction data to the system. The system can then contact the appropriate buyer account, verify that the transaction is valid and eventually facilitate settlement between the buyer account 110 and the seller. For example, the seller can send seller account information to the system. The system can cause the transfer of funds from the buyer account to the seller account.

Figure 2:
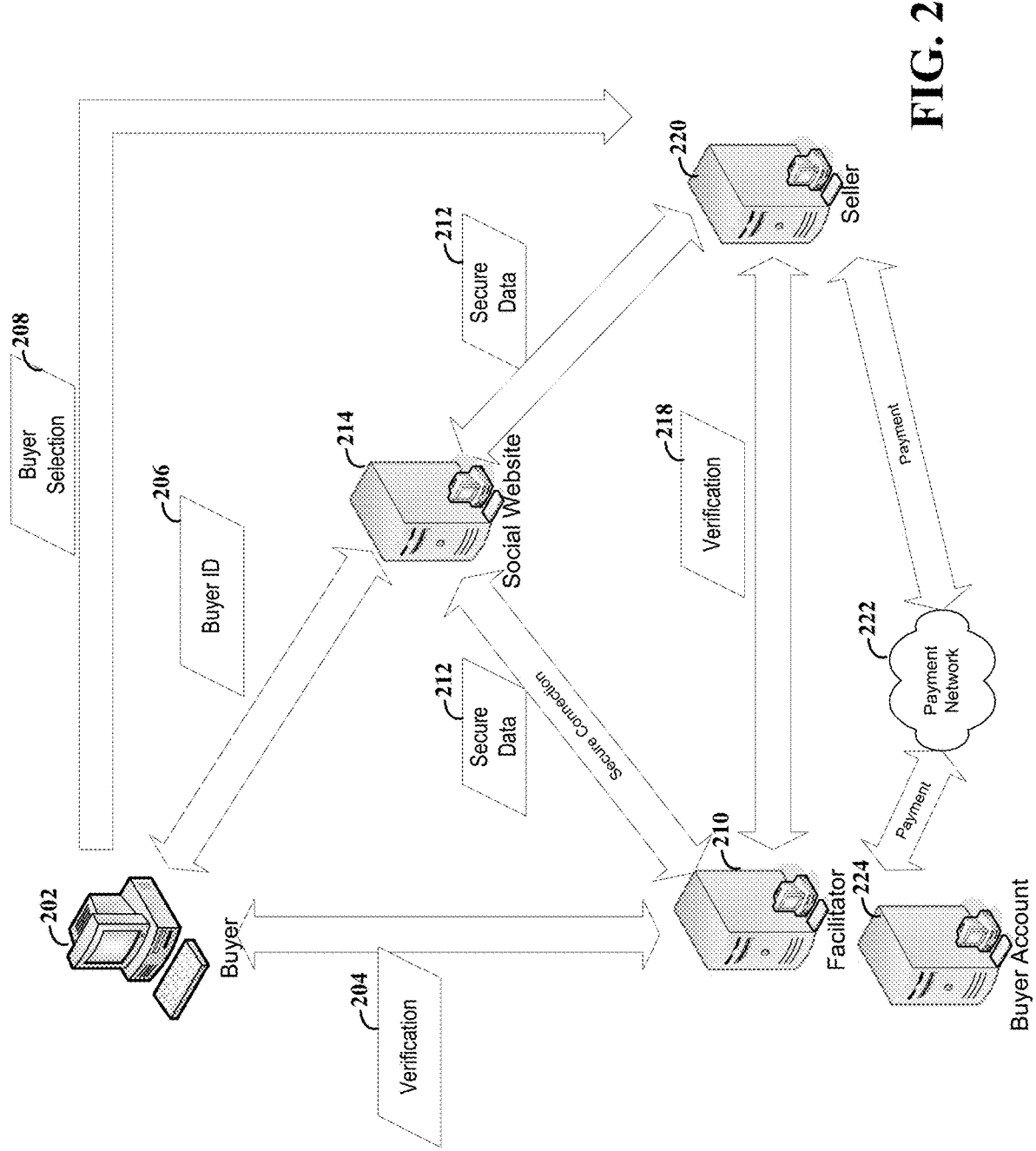
FIG. 2 shows a data flow diagram relating to a data processing system for processing Internet-based data, according to an example embodiment of the present invention.

FIG. 2 shows a data flow diagram of a system for facilitating payment between users of a first website wishing to buy offerings from a seller hosting a different website, according to an example embodiment of the present invention. Buyer 202 presents social website 214 with buyer identification 206 (e.g., login information). The social website can use buyer identification 206 for a number of purposes including, but not limited to, personalized browsing experience and targeted seller advertisements.

Social website 214 can provide buyer 202 with a way to browse goods and services offered by seller 220. This can include, for example, advertisements, links to buyer websites or displaying the goods or services within the social website 214. Buyer 202 can provide a selection of the goods or services 208. The selection can be sent directly to seller 220 or to social website 214.

According to one embodiment, social website 214 provides information about buyer 202 to facilitator 210. Social website 214 can also send secure data 212 to seller 220. Secure data 212 can be used as a verification that seller 220 was indeed connected to buyer 202 via social website 214. For example, secure data 212 can be sent from seller 220 to facilitator 210. Facilitator 210 can verify that the secure data 212 is valid.

A number of different mechanisms can be used to perform such validation steps. In many of such mechanisms, the connection between the social website 214 and the facilitator 210 can be considered a relatively secure connection. For instance, both the social website 214 and the facilitator 210 have an established relationship in which they know the respective IP address of the other. Moreover, various encryption techniques can be used, such as the use of various encryption techniques designed to frustrate fraudulent activities, such as man-in-the middle attacks or impersonations of one of the sites.

Using one example validation mechanism, social website 214 generates encrypted verification data to represent the secure data 212. This encrypted verification data can be sent to seller 220 and either be sent also to facilitator 210 or be known already by facilitator 210. Facilitator 210 receives the encrypted verification data from seller 220 and determines whether the data is valid. This verification 218 allows the facilitator 210 to provide some level of confidence that the seller is legitimate. In a specific embodiment, seller 220 is provided with an encryption program that either further modifies the secure data or generates distinct secure data. In this manner, the secure data received by facilitator 210 represents encryption from both the seller 220 and the social website 214, providing a level of confidence that both the seller 220 and the social website 214 are not being impersonated for nefarious intentions.

An alternative mechanism allows for facilitator 210 to verify the transaction, without necessarily having a direct connection between the seller 220 and the facilitator 210. The facilitator 210 can communicate to social web site 214, which in turn communicates with seller 220 and/or to buyer 202.

In one embodiment of the present invention, buyer 202 provides verification 204 to further validate the transaction data. For example, social website 214 or facilitator 210 can verify the transaction details, such as amount and a description of the goods/services, by receiving input from the buyer. In a specific instance, the seller sends transaction details to social website 214 and/or facilitator 210. Similar transaction details are received from buyer 202 and the two transaction details are compared for consistency. In one instance, social website 214 or facilitator 210 can send a copy of the transaction data to buyer 202 for verification. The transaction data can be presented to buyer 202 using interface that asks buyer 202 to confirm the details. Alternatively, buyer 202 sends transaction details without a need for social website 214 and/or facilitator 210 to first prompt for the transaction details. This can be accomplished, for example, using a software program that sends the transaction details to social website 214 and/or facilitator 210 when buyer 202 indicates an intention to purchase goods.

In another example of verification from buyer 202, social website 214 or facilitator 210 acts as an intermediary between buyer 202 and seller 220. In this manner, a record can be maintained of the purchase that is independent of buyer 202 and seller 220. This can be particularly useful for fraud monitoring or for dispute resolution.

In one embodiment of the present invention, additional security information can be requested from the buyer 202. The information could be, as examples, a username and password or additional identification (e.g., social security number or credit card number).

As discussed above, facilitator 210 can identify more than one buyer account 224. The identified account(s) can be used to pay seller 220 using payment network 222.

According to one implementation, the social website 214 can store a payment network identifier associated with the buyer 202. This identifier can be sent to the facilitator 210. This identifier can be used to identify the buyer and associated payment networks. As an example, the social website 214 can store a credit card payment network identifier (e.g., a credit card number). This identifier can be sent to facilitator 210. This can be particularly useful for allowing the use of existing (credit card) authorization mechanisms to verify the transaction and/or the buyer 202 is legitimate.

Figure 3:
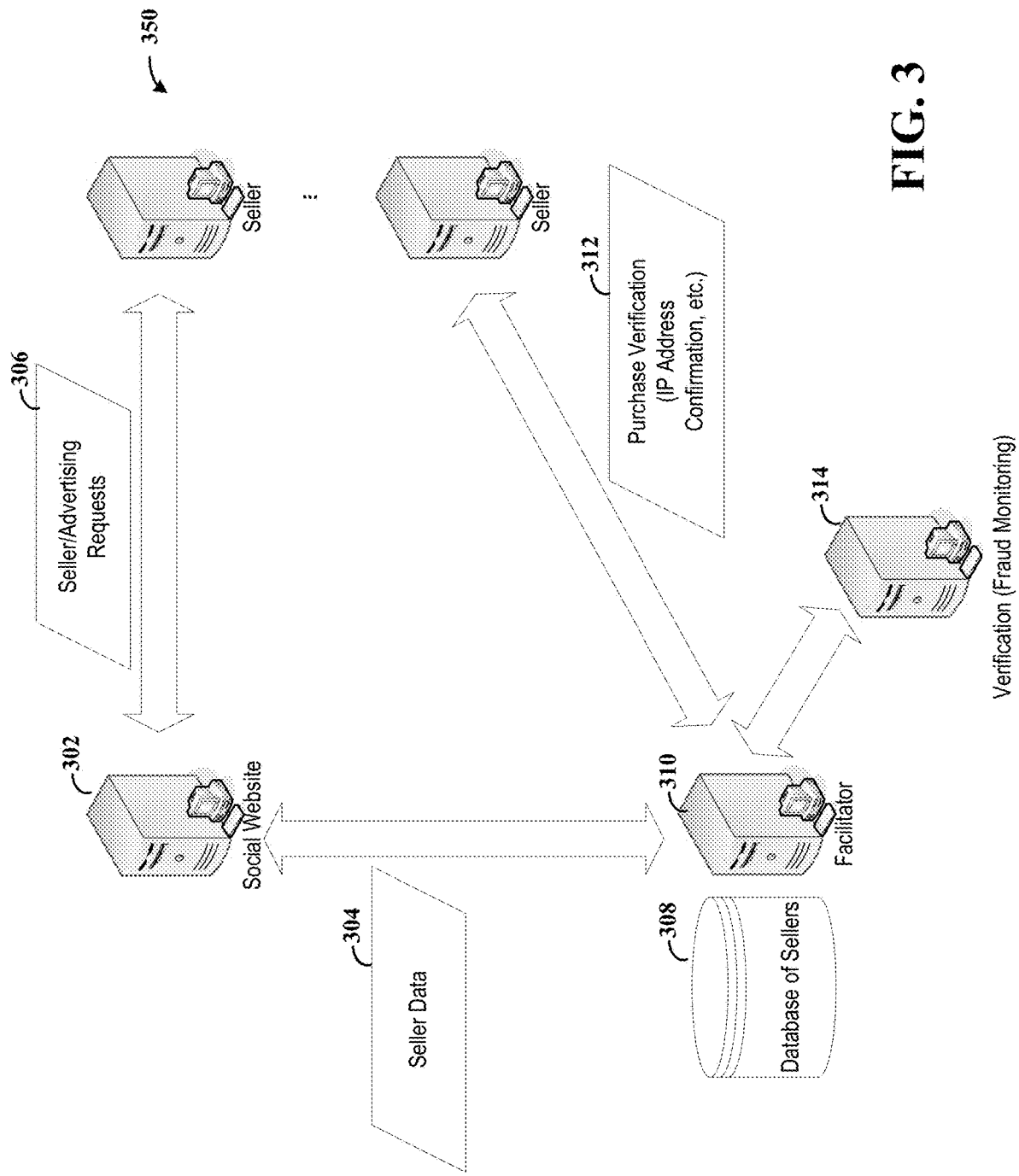
FIG. 3 shows a data flow diagram of a data processing system for generating data useful for monitoring functions, according to an example embodiment of the present invention.

FIG. 3 shows a data flow diagram of a system for monitoring payment between a user and a seller, according to an example embodiment of the present invention. The methods, systems and devices associated with FIG. 3 can be implemented alone or in combination with various other embodiments disclosed herein. Social website operator 302 receives seller requests 306 to advertise or otherwise offer users of the social website an opportunity to purchase goods or services from the sellers. The seller requests include information about sellers 350, respectively. The information/data 304 about the sellers can include information, such as business name, IP address, contact information, credit information, location, type of goods/services, (encrypted) seller identifier and the like. This seller information can then be sent to facilitator 310. This information can be stored in seller database 308. Additional information can also be stored, such as the result of background checks on the sellers and/or correlating the seller with existing databases of sellers and fraudulent activities.

When a transaction is implemented between a potential buyer and a seller, seller information 312 (relating to the transaction) can be compared to the information in seller database 308. The data can include, for example, information about where the data originates (e.g., IP address), type of goods/services and/or an encrypted identifier.

The comparison can include a simple verification that the received data matches the stored data or the comparison can include more complex comparisons, such as the use of a number of business rules. In one embodiment, a fraud detection system can be implemented. Verification/fraud detection 314 can be a separate fraud monitoring step, which can be implemented in real-time, as processing time allows, or even periodically. In many cases the actual settlement between accounts occurs later (e.g., daily) and thus the fraud detection need not be implemented in real time. It is also possible that multiple levels of verification/fraud detection can be implemented. For instance, a first verification level could be implemented in real time as a function of the seller's IP address and/or encrypted seller identification data. A second verification level could be implemented later using a number of fraud detection/monitoring mechanisms.

Figure 4:
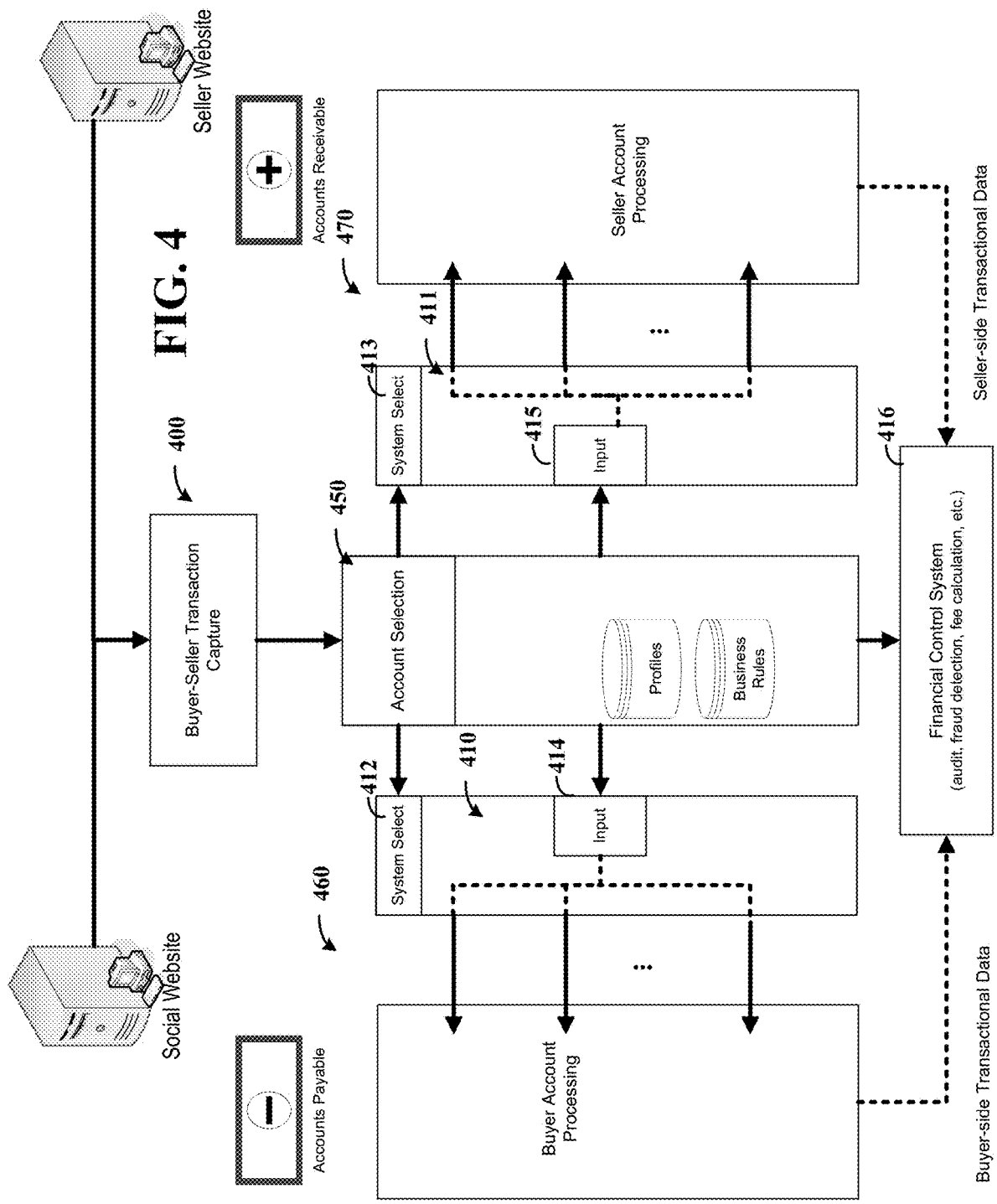
FIG. 4 shows an example system for implementing a transaction between a buyer and a seller using disparate seller and buyer networks, according to an example embodiment of the present invention.

FIG. 4 shows an example system for implementing a transaction between a buyer and a seller using disparate seller and buyer networks, according to an example embodiment of the present invention. An example of disparate networks includes the instances where the buyer account is not recognized on the seller network. The system can identify the buyer and determine that settlement can occur using a set of rules embodied and processed in the financial control system 416. A buyer wishes to purchase goods and services from a seller. A buyer/seller interface captures transaction data (400) and transmits the data upon verification to network selector 450. The transaction data includes a buyer identifier from the social website. This identifier is used to select an appropriate buyer profile. Network selector 450 provides an indication of the selected network(s) to routing blocks 460 and/or 470. Financial control system 416 receives inputs from buyer/seller interface 400 and from the selected networks.

To initiate a transaction, the buyer and seller transactional data is captured. This can be accomplished using a buyer-seller interface to capture the transaction data. In a specific embodiment, the interface is web-based and provided by either or both of the social website and seller. There are numerous other possible interfaces. The capture of the transactional data (400) includes the buyer identification, the seller identification and the transaction amount. Various other data can also be included, such as time-stamps or security information. Examples of security information include various secondary identifications including, but not limited to, personal pin numbers, biometric data, passwords, social security numbers and authentication. An external communication device (e.g., cellular phone or home computer) can be used to transmit such security information using email, Internet, short message service (SMS) or other communication protocols.

The transactional data is packaged for sending to two different networks. In one instance, the buyer information (e.g., buyer identification and/or security data) is separated from the seller information (e.g., seller identification and/or security data). This is possible due to the use of different networks by the buyer and seller. In another instance, some or all of the transaction data is duplicated for use by the system. This can be useful for a variety of applications, such as applications in which the buyer and seller networks have bilateral agreements. Further details of such applications are discussed further herein.

Network selector 450 selects a buyer and/or seller network to use in processing the transaction. The network selector compares the buyer or seller identification to a stored list of buyer or sellers. A profile is retrieved for the participant and used in the selection of the network for the participant. The data from the retrieved profile can be applied to a set of business rules to determine the network for the participant. In some instances, the selected network can be determined without knowledge of the other participant. In other instances, a profile of the other participant can also be retrieved and used to select the network. For instance, a particular network may be selected because the seller has a favorable bilateral agreement with a network that is usable by the buyer.

Once a network is selected, the necessary transactional data is sent to the selected network(s) using buyer and/or seller routing systems 460 and 470. Network selections 412 and 413 include data that indicates the proper network to route the transactional data. Inputs 414 and 415 receive the transactional data necessary for the selected network of the buyer and seller, respectively. The routing blocks 410 and 411 use this information to send the proper transactional data to the selected network from the possible networks. A network selected for the seller will process the transaction so as to credit the seller for the value of the transaction. A network selected for the buyer will process the transaction so as to debit/charge the buyer for the value of the transaction.

The settlement between the two networks can be accomplished using a number of different settlement processes. In one example of a settlement process, the networks can directly communicate with one another. This may be the case where the networks have bilateral agreements with each other. The transactional data received by each network can be used to reconcile the debit and credits for a transaction by, for example, matching a transaction identifier received by each network. Such settlement can be done immediately or on a periodic basis (e.g., daily). In the instance of direct communication between networks, the networks may have a number of settlement options of which the overall system is aware. The overall system can use network profiles and/or business rules to determine if the networks are compatible, and if so, which settlement rules to implement. The system can then provide the networks with the proper data to allow the networks to settle the transaction(s) between one another. The data may include information such as an identification of the settlement protocols to use, communication methods or fee calculations. This can be particularly useful for networks that do not have explicit bilateral agreements with one another, but nonetheless, desire to effect settlement directly with one another.

In another example of settlement, the seller and buyer networks do not directly effect settlement with one another. Instead, one or more third parties can be used to effect settlement. For instance, a financial entity 416, such as a bank, can collect from the buyer network while crediting the seller network. The financial entity reconciles the collected and credited amounts. This can be particularly useful for facilitating transactions between networks that are either incompatible or unwilling to interface directly with one another. In another example, the seller and buyer networks may be the same network and the settlement can then be implemented according to a protocol of the selected network.

Each of the selected networks is allowed to process the transaction according to their respectively established protocols. In some cases this includes the billing and reporting functions to the buyer and seller. For example, a credit card network can send a statement to the buyer that includes the transaction amount. The buyer is then obligated to repay the proper party within the credit card network. Likewise, the seller could be credited for the value of the transaction through an appropriate network and notified of the transaction details using a transaction statement/report (mailed, online or otherwise).

In a particular embodiment, a portion of the system is implemented to facilitate population of the system with buyers and/or sellers. This population system can include a database of eligible buyers and/or sellers that is used to identify potential new participants in the system. These potential participants can be notified of their eligibility using an acceptable mechanism. For example, the system may detect a purchase placed by a buyer who is a participant in a network associated with the system. The population system can perform a number of different actions with this information. For instance, the identified buyer can be immediately notified of their eligibility. This can be done, for example, by notifying the buyer or seller of the option before the transaction is completed. In some instances, the buyer may be notified of potential savings, or other incentives, should they choose to participate. This can include the option to use one or more preferred accounts associated with a network other than the network that would otherwise be used by the buyer in the instant transaction. In another example, the buyer is notified at a later date. For instance, the buyer could be notified through a targeted mailing or email communication. In another instance, the buyer can be notified of his options in conjunction with a subsequent statement or bill.

Various components of the present invention lend themselves to implementation by various parties. In this manner, aspects of the invention are directed to different components of the system being implemented by a number of different entities. The individual components can function in connection with one another so as to practice various aspects of the invention. In some instances, each party can implement a portion of the invention without having a direct relationship therebetween. For example, one entity could provide a protocol or standard to which conformance by another entity (e.g., application creators, website operators or payment network operators) allows for interoperability with the system. Other combinations of aspects of the invention are also possible and should not be considered deviations from the invention simply due to their implementation by distinct entities.

For further details regarding systems, methods and arrangements for routing, settlement and auditing between multiple networks and accounts, as may be useful with embodiments of the present invention (in whole or part), reference can be made to U.S. Provisional Applications Nos. 61/092,248 and 60/991,379, filed on Aug. 37, 2008 and Nov. 30, 2007, respectively, to Dickelman, Mark, which are each fully incorporated herein by reference.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include the implementation of various components by different entities that may or may not operate at arms length from one another. Such modifications and changes do not depart from the true spirit and scope of the present invention.

What is claimed is:

1. For use with a social network website that implements user profiles, each user profile having a user identifier, and with transactions involving products or services offered for purchase by users at a plurality of seller websites, a method implemented using one or more processor circuits and comprising:

communicating, from the social network website to at least one computer that is remote from the social network website and remote from the plurality of seller websites, a particular user-identifier corresponding to a particular user and a particular user-profile, the communication being responsive to a seller-initiated transfer request that is part of a purchase transaction involving products or services to be made by the particular user from a seller website of the seller that initiated the transfer request among the plurality of seller websites and the seller-initiated transfer request being in response to the particular user providing an indication for the purchase transaction on the social network website;

communicating, from the social network website to the at least one computer, data for the purchase transaction to be made by the particular user based on a user profile associated with the particular user, the data including at least a purchase amount and a particular payment network identifier assigned to the particular user, the particular payment being selected from a plurality of disparate payment networks based on stored rules in the user profile for effecting the transaction; and in the at least one computer, performing a set of operations that include each of:

receiving data for the purchase transaction, including data for the purchase transaction received from the seller, from the social network website;

receiving data for the purchase transaction from the particular user via a website page of a facilitator or the social network website;

verifying the purchase transaction by comparing, for consistency, the data for the purchase transaction that is received from the social network website with the data for the purchase transaction that is received from the particular user, including comparing the purchase amount and the particular payment network identifier;

identifying an assignment between the particular user-identifier and a plurality of disparate payment network identifiers;

identifying the particular user using the particular payment network identifier;

selecting a payment network identifier from the plurality of disparate payment network identifiers;

in response to the comparison in the verifying step indicating that the data for the purchase transaction received from the seller is consistent with the data for the purchase transaction received from the particular user, securely outputting and submitting the purchase transaction data to a payment network that corresponds to the selected payment network identifier according to the payment network and as part of a request to debit the purchase amount; and authorizing the purchase transaction in response to an authorization provided by the payment network corresponding to the selected payment network identifier, and outputting data indicative of the authorization, wherein the payment network of the buyer is disparate from a payment network of the seller used to complete the transaction, and the payment network associated with the seller is unaware of the payment network of the buyer for the transaction and the payment networks associated with the buyer and the seller are unable to communicate with one another absent the at least one computer and the social network website.

2. The method of claim 1, wherein the step of submitting purchase transaction data to the payment network that corresponds to the selected payment network identifier includes submitting a credit card number and wherein the payment network corresponding to the selected payment network identifier is a credit card payment network, wherein the payment network of the buyer is unsupported by the payment network of the seller absent the at least one computer and the social network website.

3. The method of claim 1, wherein, relative to the purchase transaction, the particular payment network identifier, for the payment network that corresponds to the selected payment network identifier, is not received by the seller corresponding to the seller-initiated transfer request, wherein the payment network of the buyer is unable to communicate with the payment network of the seller absent the at least one computer and the social network website.

4. The method of claim 1, wherein the step of identifying the particular user includes receiving and using authentication data in addition to the particular payment network identifier, as communicated from the social network website, to authenticate the particular user.

5. The method of claim 1, wherein the social network website provides advertisements of goods or services within the social network website; and wherein the steps of communicating, from the social website to the at least one computer, are in response to the particular user selecting at least one of the products or services for purchase, further including the steps of:

communicating, from the social network to a seller computer, secure data;

communicating, from the seller website to the at least one computer, the secure data; and verifying the secure data communicated from the seller website, and wherein submitting the purchase transaction data includes submitting the purchase transaction data in response to the verification indicating that the secure data is valid.

6. The method of claim 1, further including the steps of communicating, from the social network website to a seller computer, secure data indicating that the seller was connected to the particular user via the social network website; and communicating, from the seller website to the at least one computer, the secure data; and wherein verifying the purchase transaction includes verifying the secure data communicated from the seller website based upon encrypted data, and wherein submitting the purchase transaction data includes submitting the purchase transaction data in response to the verifying indicating that the secure data is valid.

7. The method of claim 1, further including the steps of communicating, from a seller website to the at least one computer, transaction details for the purchase transaction; and in the at least one computer, verifying that the transaction details communicated from the seller website match the data for the purchase transaction received from the particular user, wherein submitting the purchase transaction data includes submitting the purchase transaction data in response to the transaction details communicated from the seller website matching the data for the purchase transaction received from the particular user, the data received from the particular user being received from a remotely-located communication device.

8. The method of claim 1, further including the steps of communicating, from the social network website to the at least one computer, information about a plurality of sellers ("seller information") that includes, for each of the sellers, a different one or more of a business name, IP address, contact information, credit information, location, type of goods/services, and an encrypted seller identifier;

communicating, from a seller website to the at least one facilitating computer, seller information relating to the transaction; and verifying the transaction involving products or services for purchase by users by, in the at least one computer, comparing the seller information communicated from the seller website with the information about a plurality of sellers communicated from the social network website.

9. The method of claim 8, wherein the information about a plurality of sellers includes a different encrypted seller identifier for each of the plurality of sellers.

10. The method of claim 1, further including a step of, in the at least one computer, determining whether data used in verifying the purchase transaction is valid, wherein the data for the purchase transaction received from the social network website is encrypted by the social website and also by the seller that initiated the transfer request, by decrypting the purchase transaction data received from the social network website.

11. The method of claim 1, wherein the data for the purchase transaction includes an amount of the transaction and a description of products or services purchased, and the step of submitting the purchase transaction data to a payment network includes authorizing the transaction on behalf of the particular user as a prerequisite before authorizing the purchase transaction in response to the authorization provided by the payment network, by verifying that the amount of the transaction and a description of products or services purchased provided by the particular user matches the amount of the transaction and a description of products or services purchased provided by the social network website.

\* \* \* \* \*